(12) United States Patent
Franke

(10) Patent No.: US 12,731,844 B2
(45) Date of Patent: Sep. 8, 2026

(54) ELECTRIC ENERGY STORE

(71) Applicant: Bayerische Motoren Werke Aktiengesellschaft, Munich (DE)

(72) Inventor: Torsten Franke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 586 days.

(21) Appl. No.: 18/038,940

(22) PCT Filed: Jan. 13, 2022

(86) PCT No.: PCT/EP2022/050635
§ 371 (c)(1),
(2) Date: May 25, 2023

(87) PCT Pub. No.: WO2022/167187
PCT Pub. Date: Aug. 11, 2022

(65) Prior Publication Data

US 2024/0021939 A1 Jan. 18, 2024

(30) Foreign Application Priority Data

Feb. 2, 2021 (DE) ..................... 10 2021 102 338.6

(51) Int. Cl.
*H01M 50/242* (2021.01)
*B60L 50/64* (2019.01)
(Continued)

(52) U.S. Cl.
CPC ........... *H01M 50/242* (2021.01); *B60L 50/64* (2019.02); *H01M 10/613* (2015.04); (Continued)

(58) Field of Classification Search
None
See application file for complete search history.

(56) References Cited

U.S. PATENT DOCUMENTS

| | | | | |
|---|---|---|---|---|
| 2006/0246348 | A1 | 11/2006 | Hamada et al. | |
| 2012/0021260 | A1 | 1/2012 | Yasui et al. | |
| 2015/0222131 | A1 | 8/2015 | Kano | |
| 2016/0149177 | A1* | 5/2016 | Sugeno ................. | B60R 16/033 429/151 |
| 2018/0269547 | A1 | 9/2018 | Robert et al. | |

(Continued)

FOREIGN PATENT DOCUMENTS

| | | |
|---|---|---|
| DE | 20 2016 000 346 U1 | 4/2017 |
| DE | 20 2018 101 387 U1 | 4/2018 |

(Continued)

OTHER PUBLICATIONS

International Search Report (PCT/ISA/210) issued in PCT Application No. PCT/EP2022/050635 dated May 16, 2022 with English translation (4 pages).

(Continued)

*Primary Examiner* — Wyatt P McConnell
(74) *Attorney, Agent, or Firm* — Crowell & Moring LLP

(57) ABSTRACT

An electric energy store for installing into a motor vehicle with an electric drive, having at least one housing consisting of a housing upper part, a housing lower part, and an intermediate element for receiving storage cells, wherein a connection between the intermediate element and the adjacent housing parts is designed in the form of a toothing for absorbing lateral pushing forces and simultaneously increasing the resistance against pulling forces.

9 Claims, 2 Drawing Sheets

(51) Int. Cl.
*H01M 10/613* (2014.01)
*H01M 10/625* (2014.01)
*H01M 10/656* (2014.01)
*H01M 50/249* (2021.01)

(52) U.S. Cl.
CPC ....... *H01M 10/625* (2015.04); *H01M 10/656* (2015.04); *H01M 50/249* (2021.01); *H01M 2220/20* (2013.01)

(56) References Cited

U.S. PATENT DOCUMENTS

| | | | |
|---|---|---|---|
| 2020/0067045 | A1 | 2/2020 | Takano et al. |
| 2020/0076028 | A1 | 3/2020 | Darbandi et al. |
| 2020/0136212 | A1 | 4/2020 | Jung et al. |
| 2021/0111460 | A1 | 4/2021 | Yumoto |

FOREIGN PATENT DOCUMENTS

| | | | |
|---|---|---|---|
| DE | 10 2017 208 613 | A1 | 11/2018 |
| DE | 10 2020 126 424 | A1 | 4/2022 |
| EP | 1 091 428 | A2 | 4/2001 |
| EP | 3 018 729 | A1 | 5/2016 |
| JP | 2005-5167 | A | 1/2005 |
| JP | 2020-17385 | A | 1/2020 |
| KR | 10-2020-0048648 | A | 5/2020 |
| WO | WO 2020/252520 | A1 | 12/2020 |

OTHER PUBLICATIONS

German-language Written Opinion (PCT/ISA/237) issued in PCT Application No. PCT/EP2022/050635 dated May 16, 2022 (6 pages).

German-language Search Report issued in German Application No. 10 2021 102 338.6 dated Nov. 26, 2021 with partial English translation (12 pages).

Korean-language Office Action issued in Korean Application No. 10-2023-7016108 dated Apr. 17, 2025 with English translation (9 pages).

Japanese-language Office Action issued in Japanese Application No. 2023-539820 dated Feb. 16, 2026, with English translation (6 pages).

* cited by examiner

ELECTRIC ENERGY STORE

BACKGROUND AND SUMMARY

The invention relates to an electric energy store for the electrified driving of a motor vehicle, with consideration also being given to the method for constructing this energy store for use in vehicles. Such an energy store may be, for example, a lithium-ion store and is in particular also referred to as a high-voltage store, high-voltage battery or traction battery. In the following, the electric energy store is referred to in short as an energy store.

From German patent application DE 10 2020 126 424.0, the applicant internally has knowledge of an energy store for installation in a motor vehicle, composed of at least two housing parts, a housing lower part (for installation in the motor vehicle) being provided for receiving all storage cells. Arranged between the two housing part there is a middle housing part that separates the two housing parts horizontally and includes a clearance for a cooling fluid to flow through.

It is an object of the invention to further improve an energy store for electrified motor vehicles with respect to its strength.

This object is achieved by the features disclosed herein. The present disclosure also describes advantageous developments of the invention.

The invention relates to an electric energy store for installation in a motor vehicle that has an electric drive, having at least one housing composed of a housing upper part, a housing lower part and an intermediate element for receiving storage cells, and in which a connection of the intermediate element to the adjoining housing parts is designed in the form of a toothing for absorbing lateral shear forces and simultaneously increasing the resistance to tensile forces.

Preferably, the toothing is realized in the form of a butt joint and a lateral joint of the intermediate element to the housing upper part and to the housing lower part.

In a development of the invention, the toothing is designed as beads realized in the housing upper part and in the housing lower part.

The beads in the housing upper part are preferably realized for geometrical mapping and as stiffeners for the clearance for a cooling medium.

In addition, the beads may be realized in the housing lower part for geometric protection of material weakenings beneath the cells.

In a further design of the invention, the intermediate element is designed in the form of a framework of support elements that act as a force-absorbing housing extension of the cells. The support elements in this case are longer than the cells, wherein the support elements protrude beyond the cells toward the housing upper part and towards the housing lower part and thus form cavities according to the cross-section of the cells. The housing upper part and the housing lower part are shaped in such a manner that the beads are geometrically matched to these cavities and act as deep-drawn closure caps of the cavities.

The invention and possible advantageous designs of the energy store are based on the following considerations:

Based on the generally known prior art, an energy store is proposed which, over and above this prior art, has the following properties in particular:

- greater strength of the force-absorbing joints
- greater stability of the transmission of force in the event of a bollard collision
- simplified assembly of the electrical connections of the cell pack, which can be automated
- simplified structure of the electronics installation space with sealing against the vehicle exterior, and
- minimization of thermomechanical forces in the energy store Proceeding from the above-mentioned application, what ensues from the aforementioned more detailed statement of the object is as follows:

The aforementioned internal application may also be the basis for the present invention with regard to the following features: The housing lower part (under the vehicle interior floor, facing toward the road) contains a so-called "cell pack" having storage cells, the housings of which, when having been installed, are oriented vertically, and a frame arranged beneath the cell pack. The downwardly directed frame has a framework of support elements (hereinafter also referred to as "intermediate element"), which act as force-absorbing housing extensions of the cells. These support elements are realized, for example, as a separate support beneath a cell housing, or as an extension of the cell housing, or as a support tube that encompasses the cells completely and additionally has a cavity. This internal application thus relates to end-face joints of support elements combined to form an intermediate element between the middle housing part and the housing lower part, and indicates leads guided through hermetic seals for the electrical connections of the cell pack and storage electronics.

The enhancement of the tensile strength of the interfacing of the intermediate element to the housing middle part and the housing lower part, its greater resistance to bollard collision and thermomechanical forces, but also a simplified electrical connection of the cell pack to the storage electronics, as well as a simplified structure of the electronics installation space, are subject-matter of the invention.

The invention described here develops further the basic principle described in the patent application DE 10 2020 126 424.0 with regard to greater strength, simplified manufacturing and lesser use of material.

According to a main concept of the invention, the intermediate element is designed in such a manner in the direction of the adjoining housing parts that the parts are interlocked with each other. The mechanical resistance to lateral shear forces is increased as a result of the form-fit. The resistance to tensile forces is also increased by the enlargement of the contact surfaces between the joined elements.

Furthermore, the regions of the intermediate element that connect the housing parts may optionally be designed in such a manner that they can provide the electrical insulation of the cell walls, and may include embedded stiffening elements that contribute to the transmission of force between the underside of the housing and the upper side of the housing.

In addition, the electrical connection to the electrical bushing through the housing upper part may be integrated into the intermediate element, and the electrically sealed bushing may be designed in such a manner that flexible leads between the cell pack and the storage electronics, as well as from the storage electronics to the outside, are not required. The electronics installation space is simplified in such a manner that there is no need for encapsulation of the storage electronics, or the associated electrical interfaces. The housing parts are equipped to minimize thermomechanical stresses from the storage assembly.

An exemplary embodiment of the invention is represented in the drawing.

DETAILED DESCRIPTION

Figure 1:
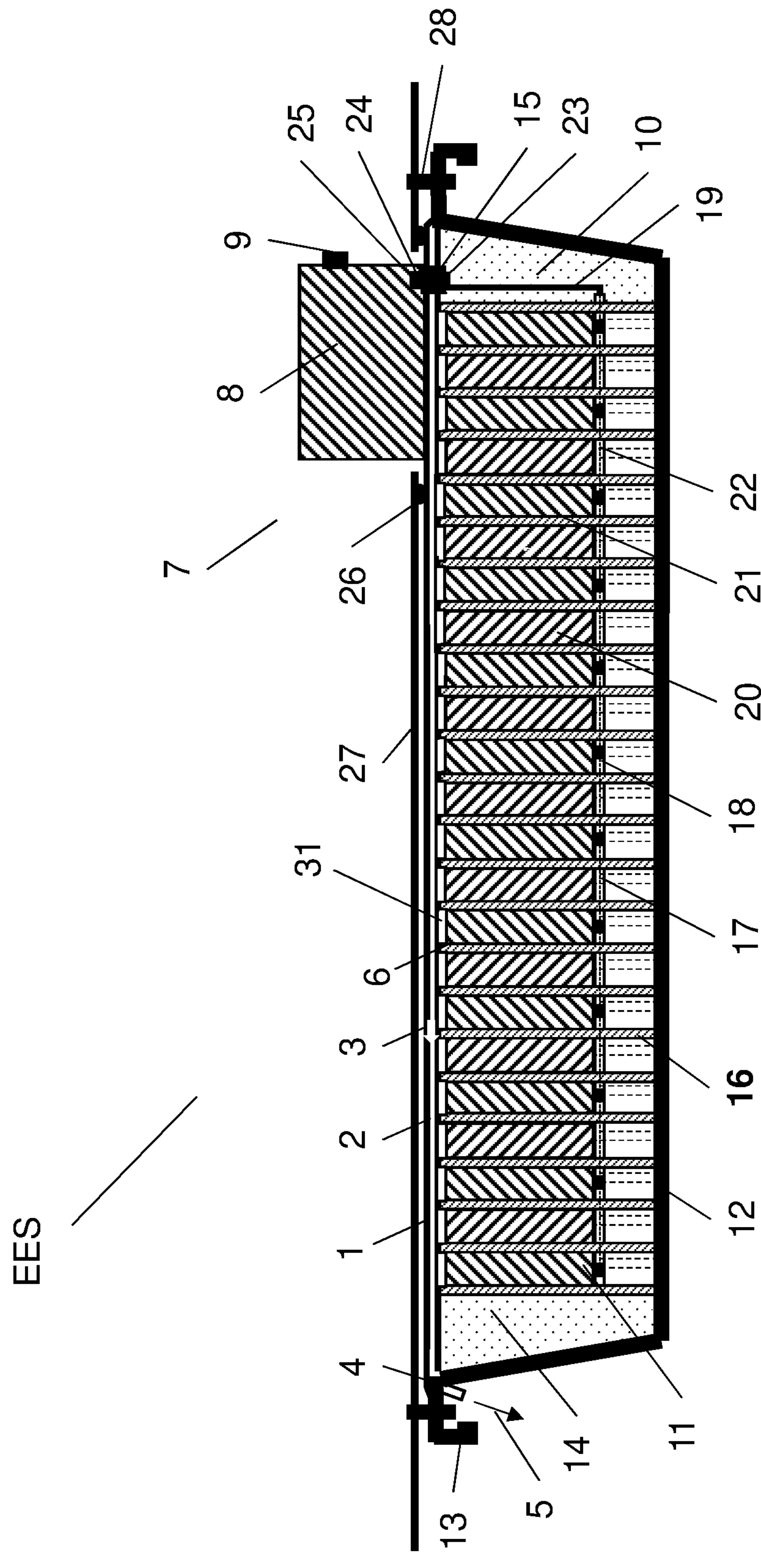
FIG. 1 shows an advantageous overall arrangement of the energy store according to the invention.

Represented in FIG. 1 is an energy store EES having a multiplicity of storage cells 20, which are arranged or (if not yet installed in the vehicle) to be arranged, in the form of a so-called cell pack 11, in a housing beneath the vehicle interior floor 27, composed of a housing upper part 1 and a housing lower part 12. The housing upper part 1 includes a clearance 2 for a flowing cooling fluid 3, which can be connected to an external cooling circuit 5 by connectors 4.

In a possible embodiment, the housing upper part 1 is at least partially provided with electrical insulation 6. In a particularly advantageous embodiment, the electrical insulation 6 can be deep-drawn, while retaining its electrical properties. The storage electronics 8 can be mounted onto the housing upper part 1, in the direction of a vehicle interior 7, by means of electrical connectors 9 attached for connection to the electrical network of the vehicle. In the direction of the lower vehicle exterior (facing toward the road), an installation space 10 for receiving a cell pack 11 is closed off by a housing lower part 12. In a preferred embodiment, the housing upper part 1 and the housing lower part 12 are joined together by a flanged seam 13. The free space of the installation space 10 surrounding the cell pack 11 is preferably filled with an elastoplastic material 14. The storage electronics 8 and the cell pack 11 are electrically connected to each other by means of at least one electrical bushing 15 attached in the housing upper part 1.

The housing upper part 1 and the housing lower part 12 are connected to each other via an intermediate element 16. The more detailed design of this connection according to the invention is represented in more detail in FIG. 2.

The intermediate element 16 is designed in the form of a framework of support elements 33, which act as a force-absorbing housing extension of the cells. These support elements 33 are realized, for example, as a separate support beneath cell housing or as an extension of the cell housing or as a support tube that encompasses the cells completely and additionally has a cavity.

The housing upper part 1, the housing lower part 12 and the intermediate element 16 with the support elements 33 are designed in such a manner that, in addition to the regions for a butt joint 29 of the intermediate element 16 to the housing upper part 1 and to the housing lower part 12, regions with lateral joints 30 of the intermediate element 16 to the housing upper part 1 and to the housing lower part 12 are also formed, in a manner analogous to joints with pins or dowels, in order to increase the stability of the cell pack 11 with respect to acting forces.

In an embodiment of the present disclosure, the beads 31 thus formed in the housing upper part 1 and the housing lower part 12 serve simultaneously for geometrical mapping and as stiffeners of the clearance 2 in the housing upper part 1, and for geometrical protection of the material weakenings 32 beneath the cells in the housing lower part 12.

In other words, the support elements 33, which form walls of the cells 20, are longer than the cells 20. The support elements 33 (and thus the intermediate element 16) thus project beyond the cells 20 toward the housing upper part 1 and/or the housing lower part 12 and thus form cavities according to the cross-section of the cells 20. The housing upper part 1 and/or the housing lower part 12 are shaped in such a manner that, for the purpose of closing these cavities, they have beads 31 that geometrically match these cavities. The beads 31 thus act as deep-drawn closure caps of the cavities that allow the lateral joints 30 for mechanical stabilization of the entire cell pack 11 to be produced.

On the underside of the housing upper part 1 the beads 31 in this case preferably also form the clearance 2 for the cooling medium 3, at least partially.

Material weakenings 32 may be formed in the beads 31 on the upper side of the housing lower part 12 by a foil, attached in the direction of the installation space 10, that closes off openings in the housing lower part 12.

In this case, contours of the intermediate element 16 directed toward the housing upper part 1 and the housing lower part 12 follow the vertical profile of housing upper part 1 and housing lower part 12.

The cell pack 11 is composed of an intermediate element 16 having cell contactings 17 and connectors for cell sensing 18, electrical connectors 19 for connection to the electrical bushing 15, cells 20, bonding 21 between the intermediate element 16, the cells and soft encapsulation 22 around the cell contactings 17 and the connectors for cell sensing 18. The cells 20 in this case may be partially electrically insulated on their surface, e.g. by means of foiling or painting. The electrical connectors 19 are designed in such a manner that they can be directly electrically connected to the electrical bushing 15 in a form that is true to shape. This may be realized, for example, by plug connection, screw connection or by a metallurgical connection such as soldering or welding. For this purpose, the electrical bushing includes inner contacts 23, directed toward the installation space 10, for contacting the electrical connectors 19, as well as outer contacts 24, connected thereto, that are directed toward the vehicle interior 7 and preferably of a touch-protected design, for contacting the storage electronics 8. The storage electronics 8 include the mating contacts 25 for the contacting of the outer contacts 24. In a preferred arrangement, when the cell pack 11 is being assembled with the housing upper part 1, the respectively associated contacts of the electrical connectors 19 and inner contacts 23 are connected to each other, in a non-detachable manner, e.g. by welding, and when the storage electronics 8 is being assembled with the housing upper part 1, the respectively associated outer contacts 24 and mating contacts 25 are again connected to each other, in a detachable manner, e.g. by plug connection. During assembling, the storage electronics 8 are mechanically fixed by known elements such as screws or catches. This assembling may be effected directly or from the vehicle interior during the process of manufacture of the EES. The mounting of the electrical bushing 15 in the housing upper part 1 is performed, for example, by screwing it to a flange or welding two parts together and filling the recess in the housing upper part 1 that accommodates the electrical bushing 15 with a plastic material.

In a further embodiment, the electrical bushing 15 includes at least one opening that, at least partially, allows the elastoplastic material 14 to be introduced. In a further embodiment, the electrical bushing 15 is already a constituent part of the intermediate element 16, and is routed through the housing upper part 1 during assembling the cell pack 11 and is fixed in the correct position and sealed by the introduction of the elastoplastic material 14. In this embodiment, the touch-protected outer contacts 24 may be formed by the corresponding shaping of the electrical connectors 19 as well as the intermediate element 16, in order to reduce the number of parts and joints. Preferably, the elastoplastic material 14 is an electrical insulating material that is fluid when being processed and that, after having been introduced, also provides the encapsulation of the electrical connectors 19 and inner contacts 23 that are non-detachably connected to each other. In a further embodiment, the elastoplastic material 14 is a material that insulates against environmental influences, that completely seals the cell pack 11 and the electrical bushing 15 against environmental influences and renders hermetic sealing of the housing upper part 1, the housing lower part 12 and the flanged seam 13 unnecessary. In a possible manufacturing process, the elastoplastic material is introduced under exclusion of moisture, e.g. in a CO2 protective-gas atmosphere, or under vacuum. The tightness of seal of the vehicle interior in the region of the vehicle interior 7 with respect to the vehicle exterior is ensured by a seal 26, attached to the housing upper part 1, that is pressed against the vehicle interior floor 27 when the EES is being mounted onto the vehicle. The EES is, for example, screwed to the vehicle interior floor 27 by means of the elements 28, with regular spacing.

Furthermore, the intermediate element 16 is made of an electrically non-conductive material and completely covers the walls 33 of the cells 20. Suitable larger clearances may advantageously be provided between the cells 20 and the intermediate element 16, which may form continuous cavities 34, between the housing upper part 1 and the housing lower part 12, for the purpose of optionally receiving stiffening elements 35 that bridge the distance between the housing upper part 1 and the housing lower part 12. The stiffening elements 35 in this case may be of variable width, e.g. overlapping at one end with respect to the intermediate element 16, and may be inserted during the process of manufacture of the intermediate element 16, e.g. by overmoulding, or inserted subsequently. Likewise, the stiffening elements 35 may be firmly connected to the housing upper part 1 and the housing lower part 12 during the assembling of the storage device. In an exemplary embodiment, the stiffening elements 35 are composed of the same material as the housing upper part 1 and the housing lower part 12, and are welded to the housing upper part 1 and the housing lower part 12 by use of known methods after the energy store has been closed.

Electric Energy Store

The invention relates to an electric energy store for the electrified driving of a motor vehicle, with consideration also being given to the method for constructing this energy store for use in vehicles. Such an energy store may be, for example, a lithium-ion store and is in particular also referred to as a high-voltage store, high-voltage battery or traction battery. In the following, the electric energy store is referred to in short as an energy store.

From the non-prepublished German patent application DE 10 2020 126 424.0, the applicant internally has knowledge of an energy store for installation in a motor vehicle, composed of at least two housing parts, a housing lower part (for installation in the motor vehicle) being provided for receiving all storage cells. Arranged between the two housing part there is a middle housing part that separates the two housing parts horizontally and includes a clearance for a cooling fluid to flow through.

It is an object of the invention to further improve an energy store for electrified motor vehicles with respect to its strength.

This object is achieved by the features of claim 1. The dependent claims are advantageous developments of the invention.

The invention relates to an electric energy store for installation in a motor vehicle that has an electric drive, having at least one housing composed of a housing upper part, a housing lower part and an intermediate element for receiving storage cells, and in which a connection of the intermediate element to the adjoining housing parts is designed in the form of a toothing for absorbing lateral shear forces and simultaneously increasing the resistance to tensile forces.

Preferably, the toothing is realized in the form of a butt joint and a lateral joint of the intermediate element to the housing upper part and to the housing lower part.

In a development of the invention, the toothing is designed as beads realized in the housing upper part and in the housing lower part.

The beads in the housing upper part are preferably realized for geometrical mapping and as stiffeners for the clearance for a cooling medium.

In addition, the beads may be realized in the housing lower part for geometric protection of material weakenings beneath the cells.

In a further design of the invention, the intermediate element is designed in the form of a framework of support elements that act as a force-absorbing housing extension of the cells. The support elements in this case are longer than the cells, wherein the support elements protrude beyond the cells toward the housing upper part and towards the housing lower part and thus form cavities according to the cross-section of the cells. The housing upper part and the housing lower part are shaped in such a manner that the beads are geometrically matched to these cavities and act as deep-drawn closure caps of the cavities.

The invention and possible advantageous designs of the energy store are based on the following considerations:

Based on the generally known prior art, an energy store is proposed which, over and above this prior art, has the following properties in particular:

- greater strength of the force-absorbing joints
- greater stability of the transmission of force in the event of a bollard collision
- simplified assembly of the electrical connections of the cell pack, which can be automated
- simplified structure of the electronics installation space with sealing against the vehicle exterior, and
- minimization of thermomechanical forces in the energy store Proceeding from the above-mentioned, non-prepublished internal prior art, what ensues from the aforementioned more detailed statement of the object is as follows:

The aforementioned internal "prior art" may also be the basis for the present invention with regard to the following features: The housing lower part (under the vehicle interior floor, facing toward the road) contains a so-called "cell pack" having storage cells, the housings of which, when having been installed, are oriented vertically, and a frame arranged beneath the cell pack. The downwardly directed frame has a framework of support elements (hereinafter also referred to as "intermediate element"), which act as force-absorbing housing extensions of the cells. These support elements are realized, for example, as a separate support beneath a cell housing, or as an extension of the cell housing, or as a support tube that encompasses the cells completely and additionally has a cavity. This internal "prior art" thus relates to end-face joints of support elements combined to form an intermediate element between the middle housing part and the housing lower part, and indicates leads guided through hermetic seals for the electrical connections of the cell pack and storage electronics.

The enhancement of the tensile strength of the interfacing of the intermediate element to the housing middle part and the housing lower part, its greater resistance to bollard collision and thermomechanical forces, but also a simplified electrical connection of the cell pack to the storage electronics, as well as a simplified structure of the electronics installation space, are subject-matter of the invention.

The invention described here develops further the basic principle described in the patent application DE 10 2020 126 424.0 with regard to greater strength, simplified manufacturing and lesser use of material.

According to the main concept of the invention, the intermediate element is designed in such a manner in the direction of the adjoining housing parts that the parts are interlocked with each other. The mechanical resistance to lateral shear forces is increased as a result of the form-fit. The resistance to tensile forces is also increased by the enlargement of the contact surfaces between the joined elements.

Furthermore, the regions of the intermediate element that connect the housing parts may optionally be designed in such a manner that they can provide the electrical insulation of the cell walls, and may include embedded stiffening elements that contribute to the transmission of force between the underside of the housing and the upper side of the housing.

In addition, the electrical connection to the electrical bushing through the housing upper part may be integrated into the intermediate element, and the electrically sealed bushing may be designed in such a manner that flexible leads between the cell pack and the storage electronics, as well as from the storage electronics to the outside, are not required. The electronics installation space is simplified in such a manner that there is no need for encapsulation of the storage electronics, or the associated electrical interfaces. The housing parts are equipped to minimize thermomechanical stresses from the storage assembly.

Figure 2:
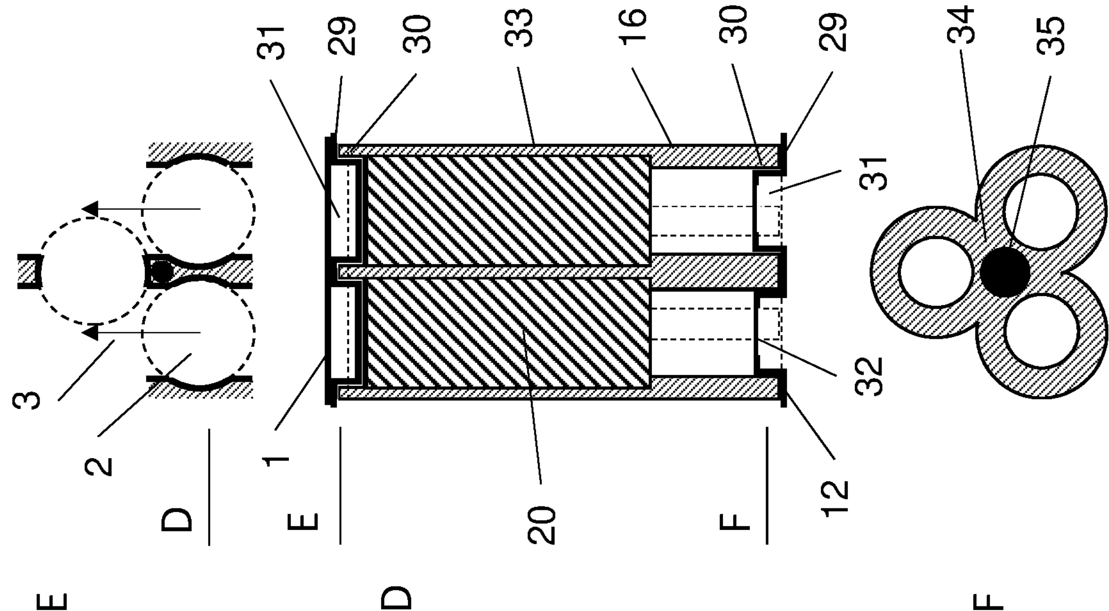
FIG. 2 shows a detail view of a particularly advantageous design for the connection, according to the invention, of the intermediate element in the direction of the adjoining housing parts for the purpose of interlocking them with each other.

An exemplary embodiment of the invention is represented in the drawing, in which FIG. 1 shows an advantageous overall arrangement of the energy store according to the invention, and FIG. 2 shows a detail view of a particularly advantageous design for the connection, according to the invention, of the intermediate element in the direction of the adjoining housing parts for the purpose of interlocking them with each other.

Represented in FIG. 1 is an energy store EES having a multiplicity of storage cells 20, which are arranged or (if not yet installed in the vehicle) to be arranged, in the form of a so-called cell pack 11, in a housing beneath the vehicle interior floor 27, composed of a housing upper part 1 and a housing lower part 12. The housing upper part 1 includes a clearance 2 for a flowing cooling fluid 3, which can be connected to an external cooling circuit 5 by connectors 4.

In a possible embodiment, the housing upper part 1 is at least partially provided with electrical insulation 6. In a particularly advantageous embodiment, the electrical insulation 6 can be deep-drawn, while retaining its electrical properties. The storage electronics 8 can be mounted onto the housing upper part 1, in the direction of a vehicle interior 7, by means of electrical connectors 9 attached for connection to the electrical network of the vehicle. In the direction of the lower vehicle exterior (facing toward the road), an installation space 10 for receiving a cell pack 11 is closed off by a housing lower part 12. In a preferred embodiment, the housing upper part 1 and the housing lower part 12 are joined together by a flanged seam 13. The free space of the installation space 10 surrounding the cell pack 11 is preferably filled with an elastoplastic material 14. The storage electronics 8 and the cell pack 11 are electrically connected to each other by means of at least one electrical bushing 15 attached in the housing upper part 1.

The housing upper part 1 and the housing lower part 12 are connected to each other via an intermediate element 16. The more detailed design of this connection according to the invention is represented in more detail in FIG. 2.

The intermediate element 16 is designed in the form of a framework of support elements 33, which act as a force-absorbing housing extension of the cells. These support elements 33 are realized, for example, as a separate support beneath cell housing or as an extension of the cell housing or as a support tube that encompasses the cells completely and additionally has a cavity.

The housing upper part 1, the housing lower part 12 and the intermediate element 16 with the support elements 33 are designed in such a manner that, in addition to the regions for a butt joint 29 of the intermediate element 16 to the housing upper part 1 and to the housing lower part 12, regions with lateral joints 30 of the intermediate element 16 to the housing upper part 1 and to the housing lower part 12 are also formed, in a manner analogous to joints with pins or dowels, in order to increase the stability of the cell pack 11 with respect to acting forces.

In an embodiment essential to the invention, the beads 31 thus formed in the housing upper part 1 and the housing lower part 12 serve simultaneously for geometrical mapping and as stiffeners of the clearance 2 in the housing upper part 1, and for geometrical protection of the material weakenings 32 beneath the cells in the housing lower part 12.

In other words, the support elements 33, which form walls of the cells 20, are longer than the cells 20. The support elements 33 (and thus the intermediate element 16) thus project beyond the cells 20 toward the housing upper part 1 and/or the housing lower part 12 and thus form cavities according to the cross-section of the cells 20. The housing upper part 1 and/or the housing lower part 12 are shaped in such a manner that, for the purpose of closing these cavities, they have beads 31 that geometrically match these cavities. The beads 31 thus act as deep-drawn closure caps of the cavities that allow the lateral joints 30 for mechanical stabilization of the entire cell pack 11 to be produced.

On the underside of the housing upper part 1 the beads 31 in this case preferably also form the clearance 2 for the cooling medium 3, at least partially.

Material weakenings 32 may be formed in the beads 31 on the upper side of the housing lower part 12 by a foil, attached in the direction of the installation space 10, that closes off openings in the housing lower part 12.

In this case, contours of the intermediate element 16 directed toward the housing upper part 1 and the housing lower part 12 follow the vertical profile of housing upper part 1 and housing lower part 12.

The cell pack 11 is composed of an intermediate element 16 having cell contactings 17 and connectors for cell sensing 18, electrical connectors 19 for connection to the electrical bushing 15, cells 20, bonding 21 between the intermediate element 16, the cells and soft encapsulation 22 around the cell contactings 17 and the connectors for cell sensing 18. The cells 20 in this case may be partially electrically insulated on their surface, e.g. by means of foiling or painting. The electrical connectors 19 are designed in such a manner that they can be directly electrically connected to the electrical bushing 15 in a form that is true to shape. This may be realized, for example, by plug connection, screw connection or by a metallurgical connection such as soldering or welding. For this purpose, the electrical bushing includes inner contacts 23, directed toward the installation space 10, for contacting the electrical connectors 19, as well as outer contacts 24, connected thereto, that are directed toward the vehicle interior 7 and preferably of a touch-protected design, for contacting the storage electronics 8. The storage electronics 8 include the mating contacts 25 for the contacting of the outer contacts 24. In a preferred arrangement, when the cell pack 11 is being assembled with the housing upper part 1, the respectively associated contacts of the electrical connectors 19 and inner contacts 23 are connected to each other, in a non-detachable manner, e.g. by welding, and when the storage electronics 8 is being assembled with the housing upper part 1, the respectively associated outer contacts 24 and mating contacts 25 are again connected to each other, in a detachable manner, e.g. by plug connection. During assembling, the storage electronics 8 are mechanically fixed by known elements such as screws or catches. This assembling may be effected directly or from the vehicle interior during the process of manufacture of the EES. The mounting of the electrical bushing 15 in the housing upper part 1 is performed, for example, by screwing it to a flange or welding two parts together and filling the recess in the housing upper part 1 that accommodates the electrical bushing 15 with a plastic material.

In a further embodiment, the electrical bushing 15 includes at least one opening that, at least partially, allows the elastoplastic material 14 to be introduced. In a further embodiment, the electrical bushing 15 is already a constituent part of the intermediate element 16, and is routed through the housing upper part 1 during assembling the cell pack 11 and is fixed in the correct position and sealed by the introduction of the elastoplastic material 14. In this embodiment, the touch-protected outer contacts 24 may be formed by the corresponding shaping of the electrical connectors 19 as well as the intermediate element 16, in order to reduce the number of parts and joints. Preferably, the elastoplastic material 14 is an electrical insulating material that is fluid when being processed and that, after having been introduced, also provides the encapsulation of the electrical connectors 19 and inner contacts 23 that are non-detachably connected to each other. In a further embodiment, the elastoplastic material 14 is a material that insulates against environmental influences, that completely seals the cell pack 11 and the electrical bushing 15 against environmental influences and renders hermetic sealing of the housing upper part 1, the housing lower part 12 and the flanged seam 13 unnecessary. In a possible manufacturing process, the elastoplastic material is introduced under exclusion of moisture, e.g. in a $CO_2$ protective-gas atmosphere, or under vacuum. The tightness of seal of the vehicle interior in the region of the vehicle interior 7 with respect to the vehicle exterior is ensured by a seal 26, attached to the housing upper part 1, that is pressed against the vehicle interior floor 27 when the EES is being mounted onto the vehicle. The EES is, for example, screwed to the vehicle interior floor 27 by means of the elements 28, with regular spacing.

Furthermore, the intermediate element 16 is made of an electrically non-conductive material and completely covers the walls 33 of the cells 20. Suitable larger clearances may advantageously be provided between the cells 20 and the intermediate element 16, which may form continuous cavities 34, between the housing upper part 1 and the housing lower part 12, for the purpose of optionally receiving stiffening elements 35 that bridge the distance between the housing upper part 1 and the housing lower part 12. The stiffening elements 35 in this case may be of variable width, e.g. overlapping at one end with respect to the intermediate element 16, and may be inserted during the process of manufacture of the intermediate element 16, e.g. by overmoulding, or inserted subsequently. Likewise, the stiffening elements 35 may be firmly connected to the housing upper part 1 and the housing lower part 12 during the assembling of the storage device. In an exemplary embodiment, the stiffening elements 35 are composed of the same material as the housing upper part 1 and the housing lower part 12, and are welded to the housing upper part 1 and the housing lower part 12 by use of known methods after 20 the energy store has been closed.

The invention claimed is:

1. An electric energy store for installation in a motor vehicle that has an electric drive, the electric energy store comprising:

at least one housing composed of a housing upper part, a housing lower part and an intermediate element for receiving storage cells, wherein a connection of the intermediate element to adjoining housing parts comprises a toothing configured to absorb lateral shear forces, wherein the toothing comprises beads in the housing upper part and in the housing lower part, wherein the intermediate element is designed in a form of a framework of support elements that act as a force-absorbing housing extension of the cells, wherein the support elements are longer than the cells, wherein the support elements protrude beyond the cells toward the housing upper part and towards the housing lower part and form cavities according to a cross-section of the cells, and wherein the housing upper part and the housing lower part are shaped such that the beads are geometrically matched to the cavities and act as deep-drawn closure caps of the cavities.

2. The energy store according to claim 1, wherein the toothing is in a form of a butt joint and a lateral joint of the intermediate element to the housing upper part and to the housing lower part.

3. The energy store according to claim 1, wherein the beads in the housing upper part are configured for geometrical mapping and as stiffeners for clearance.

4. The energy store according to claim 1, wherein the beads in the housing lower part are configured to provide geometric protection of material weakenings beneath the cells.

5. The energy store according to claim 1, wherein the housing upper part has a clearance for a flowing cooling fluid, and on the underside of the housing upper part, the beads form this clearance at least partially.

6. The energy store according to claim 1, wherein the housing upper part has a clearance for a flowing cooling fluid.

7. The energy store according to claim 1, wherein material weakenings are formed in the beads on an upper side of the housing lower part by a foil that is attached in a direction of an installation space and that closes off openings in the housing lower part.

8. The energy store according to claim 1, wherein regions of the intermediate element that connects the adjoining housing parts are configured to provide electrical insulation of cell walls.

9. The energy store according to claim 1, wherein the intermediate element is designed in a form of a framework of electrically non-conductive support elements, wherein the intermediate element, with the electrically non-conductive support elements, forms walls of the cells and covers the cells completely, wherein stiffening elements that bridge a distance between the housing upper part and the housing lower part are inserted in clearances between the cells and the intermediate element in the form of continuous cavities between the housing upper part and the housing lower part.

* * * * *